July 14, 1970 R. E. PACE 3,520,065
PENDULOUS INCLINOMETER DEVICE
Filed Oct. 19, 1967 3 Sheets-Sheet 1

*INVENTOR.*
ROBERT E. PACE
BY
MICHAEL F. OGLO
ROY MILLER
ATTORNEYS.

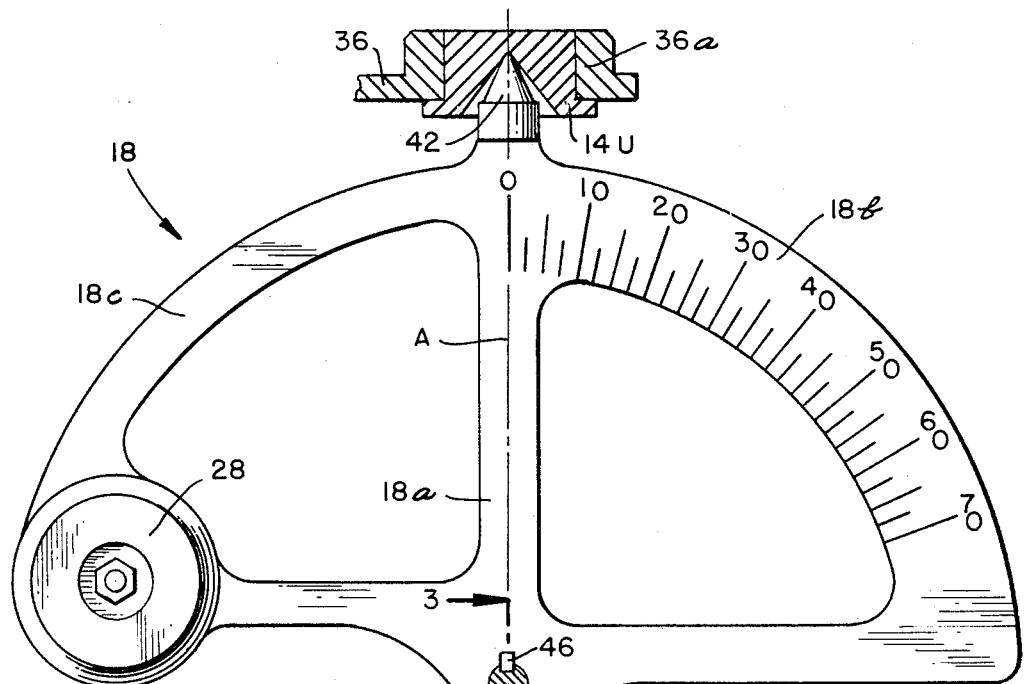
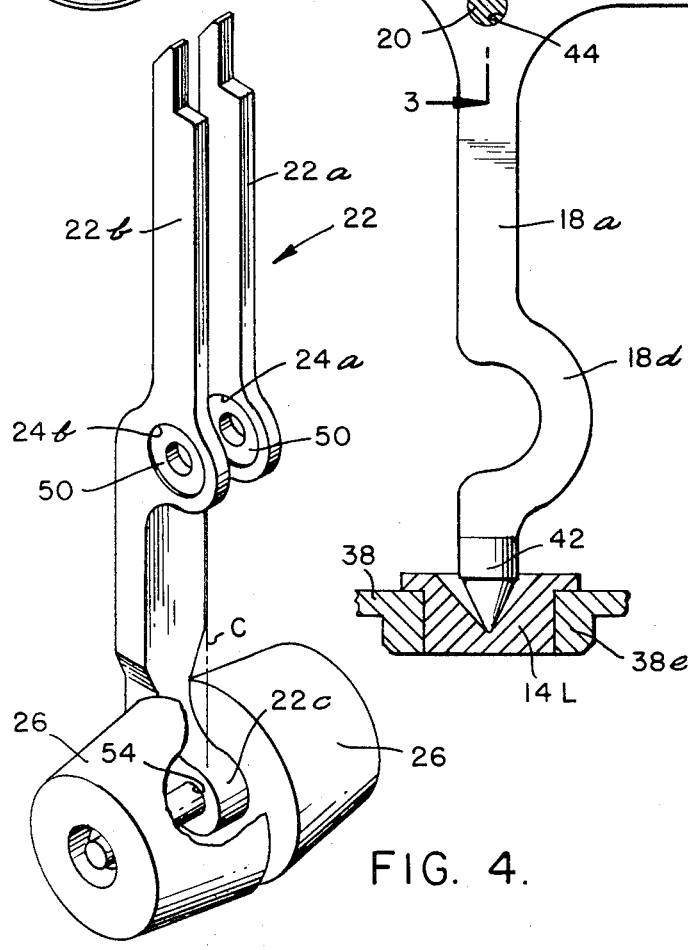

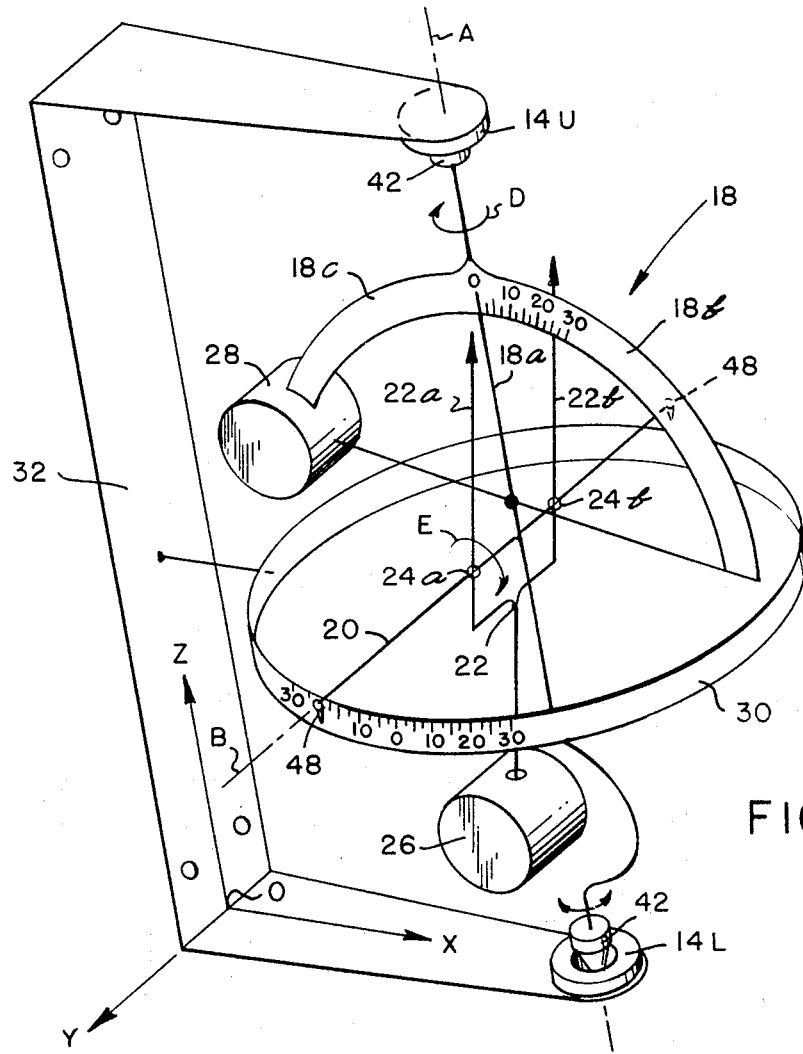
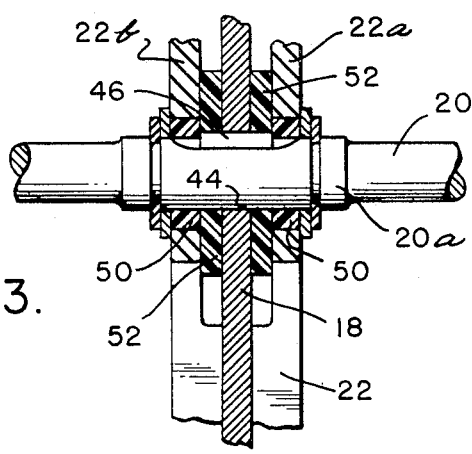
FIG. 5.
FIG. 3.

United States Patent Office 3,520,065
Patented July 14, 1970

1

3,520,065
PENDULOUS INCLINOMETER DEVICE
Robert E. Pace, Long Beach, Calif., assignor to the United States of America as represented by the Secretary of the Navy
Filed Oct. 19, 1967, Ser. No. 677,011
Int. Cl. G01c 9/14
U.S. Cl. 33—215       2 Claims

ABSTRACT OF THE DISCLOSURE

An inclinometer device for use in providing information concerning a sloped plane comprises a frame for supporting a pair of pivot bearings in alignment along a generally vertical frame axis. A subframe made of one-piece metal plate construction is mounted between these bearings for rotation about the axis. The pendulum is pivotally mounted to the subframe to swing about a pendulum arm pivot axis which is transverse to the subframe and which intersects the vertical frame axis at a point equidistant between the pivot bearings. The pendulum arm is adapted to have the center of gravity of the pendulum weight lie in the plane of the subframe and is limit stopped to allow the pendulum arm to deflect only to one side of the vertical frame axis. The subframe also includes an integral moment arm structure which carries an auxiliary weight. This moment arm structure is disposed to the side of the vertical frame axis in which the pendulum arm swings, and is adapted to have the center of gravity of the auxiliary weight lie in the plane of the subframe. As the frame tilts in accordance with the slope of the plane under measurement, the plane of the subframe will align itself in the direction of maximum slope along the plane, and the pendulum arm will align itself in a vertical attitude relative to space. The frame carries a scale which cooperates with a pointer carried by the subframe to indicate relative direction of the maximum slope. The subframe carries a scale which cooperates with a pointer carried by the pendulum arm to indicate angular magnitude of inclination in this direction.

The invention described herein may be manufactured and used by or for the Government of the United States of America for governmental purposes without the payment of any royalties thereon or therefor.

This invention relates to a pendulous inclinometer device for providing information concerning a sloped plane.

An object of this invention is to provide a pendulous inclinometer device which indicates the relative direction of maximum slope along a sloped plane and which indicates the angular magnitude of inclination in this direction.

Another object is to provide an instrument in accordance with the previous objective which is capable of sensing and indicating direction of maximum slope along a sloped plane for small magnitudes of inclination from the horizontal.

A further objective is to provide an instrument in accordance with the first objective having a scheme of scales which enables the relative direction of the maximum slope, and the magnitude of inclination in this direction to be simultaneously viewed along a single line of sight axis, and therefore is of particular utility where the information is to be monitored by closed circuit television.

Other objects and many of the attendant advantages of this invention will be readily appreciated as the same becomes better understood by reference to the following detailed description when considered in connection with the accompanying drawings wherein:

2

FIG. 2 is an enlarged side elevation of a component of the device of FIG. 1;

FIG. 3 is an enlarged section taken along lines 3—3, FIG. 2;

FIG. 4 is an enlarged perspective view of another component of the device of FIG. 1;

FIG. 5 is a diagrammatic drawing illustrating the operation of the device of FIG. 1.

Figure 1:
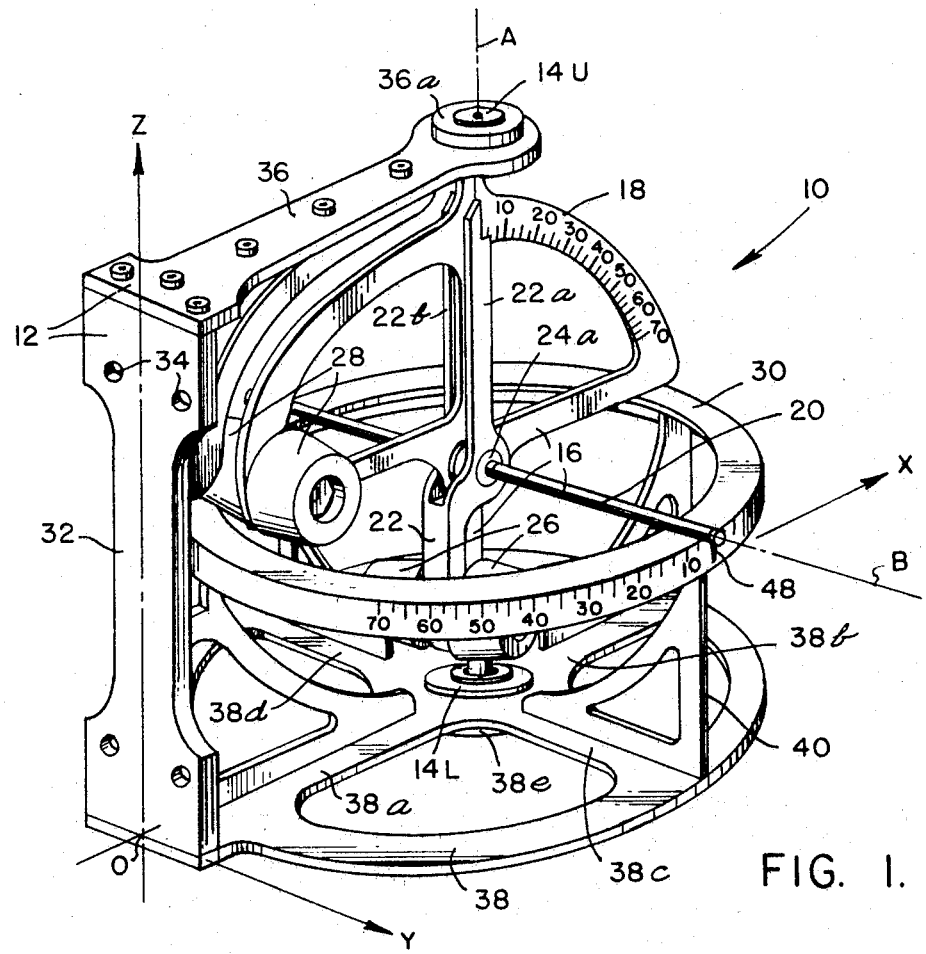
FIG. 1 is a perspective view of an inclinometer device in accordance with the present invention.

Referring not to the drawing, and in particular to FIG. 1, the subject of the invention is an inclinometer device 10, which provides two items of information concerning a sloped plane. These two items of information consist of the direction of the slope, i.e. the direction along which its gradient is maximum, and the angular magnitude of gradient in this direction.

The main parts of inclinometer device 10 comprise a frame 12, whose fundamental purpose is to support a pair of upper and lower pivot bearings 14U and 14L aligned along a generally vertical axis A. Pivot bearings 14U and 14L (best shown in FIG. 2) serve as the mounting means for a unitary rotation and pendulum assembly 16 comprising a rotatable subframe 18, a transverse shaft 20, and a pendulum arm 22. Subframe 18 is a planar element made of metal plate and is mounted between pivot bearings 14U and 14L for free rotation about axis A. Transverse shaft 20 projects from both sides of subframe 18 along an axis B perpendicular to the plane of subframe 18. The upper portion of pendulum arm 22 forms a pair of forked arms 22a and 22b which straddle subframe 18. The forked arms are provided with aligned apertures 24a, 24b (FIG. 1 shows only 24a) by which the pendulum arm is journaled to oppositely projecting portions of transverse shaft 20. This construction enables the pendulum arm 22 to freely swing about axis B. A pendulum weight 26 is affixed to the lower end of pendulum arm 22, and an auxiliary weight 28 is affixed to rotatable subframe 18. Frame 12 also supports a ring 30 having angular graduations inscribed on its outer periphery.

Proceeding now with a more detailed description of the components, frame 12 is intended for attachment to some external structure which bodily moves in accordance with changes of slope of the plane under measurement. In the embodiment depicted, the element of the frame structure which is used for making this attachment is a vertical frame member 32. Bolt holes 34 are provided to facilitate attachment to the structure. Cantilevered from the upper end of member 32 is a bracket arm 36. The outer end of bracket arm 36 is provided with a boss 36a, FIG. 2, which is the seat for upper pivot bearing 14U. Cantilevered from the lower end of member 32 is a spider 38 having a pair of radial arms 38a, 38b aligned with vertical frame member 32, and another pair of transversely aligned radial arms 38c, 38d. Spider 38 serves two purposes. Firstly, it is provided with a boss 38e, FIG. 2, at its center, which is the seat for lower pivot bearing 14L. Secondly, it is part of the mounting arrangement for the previously described graduated ring 30. Vertical supports 40 are affixed to the upper face of the radial arm of the spider, and graduated ring 30 rests upon, and is affixed to, these supports. The graduations on the outside of ring 30 form two scales for indicating direction of the slope. One of the scales is on the side of the ring 30 shown in the drawing. Its zero deflection graduation is aligned along axis of radial arm 38c. Graduations representing increasing angular values extend in both directions relative to the zero deflection graduation. A like scale is inscribed on the opposite side of ring 30, with its zero deflection graduation aligned along the axis of radial arm 38d. The dimensions and arrangement of frame 12 are such that the components of assembly 16 may rotate and swing about their pivot axes without striking the frame.

Referring now to FIG. 2, taken in conjunction with FIG. 1, rotatable subframe 18 is a one-piece construction comprising a central shank 18a aligned along axis of rotation A. A graduated quadrant 18b and a weight support quadrant 18c are formed as integral parts of subframe 18 to one and the other sides of the upper half of the shank. Needlepoint terminals 42 are affixed to the ends of shank 18a, and a crook 18d is formed in the shank adjacent to its lower end. A scale is inscribed on each face of graduated quadrant 18d. Each scale comprises a graduation line aligned along axis A, representing the zero angular value, and graduations representing increasing angular values extending down along the arc of the quadrant. Auxiliary weight 28 is attached to quadrant 18c at the lower end of its arc. This location provides the weight with a maximum moment arm about axis A. Auxiliary weight 28 is of a split construction with its component halves bolted to one and the other faces of subframe 18, so that its center of gravity will lie in the plane of the subframe 18. A keyed aperture 44 is disposed equidistantly between the ends of shank 18a. As shown in FIG. 3, transverse shaft 20 is a single-piece rod which extends through aperture 44. The portion of shaft 20 which engages aperture 44 is an enlarged diametered section 20a and is locked against relative rotation with respect to subframe 18 by means of a key 46. The ends of shaft 20 extend outwardly for a distance slightly beyond the graduated ring 30, and downwardly directed pointers 48, FIG. 1, are affixed to the ends of the shaft to cooperate with the graduations.

Pendulum arm 22, best shown in FIG. 5, is a bifurcated member having an integral lower portion and a forked upper portion. The fork arms 22a, 22b form pointers which cooperate with the graduations on the opposite faces of graduated quadrant 18b. Referring now to FIG. 5 in conjunction with FIG. 4, the forked arms 22a, 22b are journaled to shaft 20 by an arrangement of bushings 50 in apertures 24a, 24b, and spacer washers 52 between the forked arms and subframe 18. Bushings 50 and washers 52 are made of conventional low friction plastic material. The pendulum arm 22 has a diametric axis C, and the portion of the arm below the fork is offset to one side of this axis, except at the extreme lower end. There the pendulum arm forms a lateral protuberance 22c containing a bolt hole 54 having its center along axis C. This construction enables the pendulum arm to assume a vertical position in which lateral protuberance 22c is nested within the crook 18d of the subframe shank, and the offset span between the fork and the lateral protuberance folds against the edge of the subframe shank. Engagement of the edge of the offset portion of the pendulum arm 22 with the confronting edge of subframe 18 effects a limit stop action, which limits deflection of the lower portion of the pendulum arm to angular directions to the side of shank 18a to which weight support quadrant 18c is connected. Pendulum weight 26, like the previously described auxiliary weight 28, is of a split construction with its center of gravity lying in the central plane of member 22. Moreover, the arrangement by which forked arms 22a, 22b straddle and are journaled to rotatable subframe 18, results in the center of gravity of pendulum weight 26 lying in the plane of subframe 18 as well.

Before describing the operation of inclinometer device 10, it is necessary to describe certain relationships of alignment between its frame 12, and the external structure to which it is to be mounted. The centerline OZ, FIG. 1, through vertical frame member 13 constitutes a vertical alignment axis. The device must be mounted to the external structure such that axis OZ is vertical when the plane under measurement is in a horizontal attitude. A reference axis OX, which is perpendicular to axis OZ in the direction intersecting axis A, constitutes the horizontal directional axis of the device. The readout of direction of slope provided by device 10 is relative to axis OX. An axis OY, perpendicular to axes OX and OZ, complete a three dimensional system of Cartesian reference axes associated with frame 12. When frame 12 is properly mounted the plane XOY is parallel to the plane whose slope is under measurement.

The operation of inclinometer device 10 will now be described with reference to the diagrammatic and perspective view of FIG. 5. Assume that the device is initially in a position with its components in the relative positions shown in FIG. 1, and it is then tilted such that plane XOY becomes obliquely sloped relative to directional axis OX. The oblique slope to which it is tilted consists of a slope with its general direction (i.e. direction of maximum inclinations) 15° clockwise relative to directional axis OX, and with a positive angular magnitude of inclination of 10° along such direction of the slope. The perspective shown in FIG. 5 corresponds to the assumed new slope condition. Since pendulum weight 26 and auxiliary weight 28 are supported by freely pivoted members, they will seek equilibrium positions with their center of gravities as low as possible, and will exert moment forces upon these support members about the pivot axes. As previously noted, the center of gravities of both weight 26 and weight 28 lie with the plane of subframe 18. Accordingly, they will act in concert in applying an angular moment, represented by arrow D, to subframe 18 about axis A. Pendulum weight 26 applies an angular moment, represented by arrow E, to pendulum arm 22 about axis B. In response to these moments, pendulum arm 22 will swing to a vertical position, and unitary rotation and pendulum assembly 16 will bodily swing into the position in which the plane of subframe 18 is aligned in the direction of the maximum gradient along the slope. Subframe 18 and pendulum arm 22 are shown in these positions in FIG. 6. In these positions pointers 48 point to the "15° clockwise" graduation line on the scale on ring 30 and the forked arms 22a, 22b of pendulum 22 point to the 10° graduation line on the scales on the faces of quadrant 18b. While pointer 48 indicates the direction of the slope of a plane relative to axis OX, it does not indicate whether the slope is positive or negative in this direction. This can be readily determined by observing the relative position of weights 28 (*and not by any relationship shown on the scales*). Subframe 18 will be aligned in the direction of the slope with weight 28 disposed toward the "down slope" direction in this plane. For example, as depicted in FIG. 5, the plane of subframe 18 is aligned 15° clockwise relative to axis OX with weight 28 oriented toward the direction 195° clockwise relative to axis OX. Thus the "down slope" direction is 195° clockwise relative to axis OX, and the "up slope" direction is 15° clockwise relative to axis OX.

The scheme of scales and procedures for interpreting them, just described, are for a particular operational requirement in which the inclinometer is used on an ocean bottom exploration vehicle employing closed circuit television. The operation requirements for this use are limited to slopes having their directions of maximum gradients within a sector extending 70° to either side of axis OX. Also, it is required that both the scale for direction of slope and the scale for magnitude of bearing be simultaneously within the view of a television camera having a line of sight axis lateral to axis OX. (These requirements will be better understood in light of the description of an installation of device 10 on such an ocean bottom exploration vehicle later in this specification.) However, it is to be appreciated that the broad principles of this invention will suggest many other arrangements of scales to persons of average skill in the art. For example the graduated quadrant 18b could serve as an indicator in cooperation with 360° of graduations about ring 30. The latter arrangement would yield a full 360° indicating ability, with the indicator itself always pointing toward the positive slope direction.

An important feature of the invention relates to the attachment of auxiliary weight 28 to subframe 18. In situations where the angular magnitude of inclination is small, the deflection of pendulum arm 22 is slight and the moment arm by which the pendulum weight 26 acts about axis A would be very small. However, auxiliary weight acts about axis A with a substantial moment arm regardless of magnitude of inclination, and therefore can overcome the residual friction of the pivot bearings in these situations. This materially enhances the instrument's capability to indicate direction of the slope for small magnitudes of inclinations. Also, auxiliary weight 28 serves to compensate for the moment effect produced by the mass of graduated quadrant 18b. If the moment effect of the mass of quadrant 18b were not compensated, the subframe 18 would not always align itself in a direction allowing the pendulum arm 22 to swing away from the edge of the shank 18a of the subframe.

Figure 6:
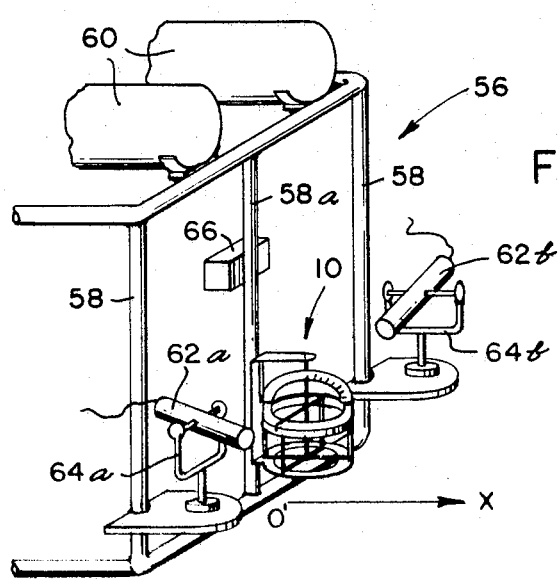
FIG. 6 illustrates a utility of the device of FIG. 1 in conjunction with an ocean bottom exploration vehicle employing closed circuit television.

FIG. 6 shows a specific use of inclinometer device 10 in connection with a remotely controlled ocean bottom exploration vehicle 56, which employs closed circuit television to provide a display of the ocean bottom scene. The video signal is relayed to the remote station via a cable, not shown, tethered to the vehicle. The drawing shows only the front end portion of the vehicle, which is of the type having an open, fully flooded frame 58 with longitudinally extending buoyancy tanks 60 affixed to the top of the frame. Tanks 60 are adapted to make the craft neutrally buoyant. The vehicle is remotely controllable to maneuver, hover, or come to rest on the ocean bottom by means not shown. For a more detailed description of a craft of this type, reference is made to the copending application of Jack L. Sayre, Jr. entitled "Underwater Recovery Vehicle," Ser. No. 569,523, filed Aug. 1, 1966.

Inclinometer device 10 is mounted with its vertical frame member 32 attached to and aligned with a vertical framework element 58a located at the center of the front end of vehicle 56. The directional axis OX of device 10 is aligned with the longitudinal axis O'X' of the vehicle. The base of the framework is rectangular and defines a plane, and when the vehicle rests on the bottom, this plane assumes the slope of the ocean bottom. Television camera stations 62a and 62b are provided at extreme outboard positions of the craft's front end. These camera stations are mounted to motor driven, remotely controlled, universal gimbals 64a, 64b, which enable the line of sights of the cameras to be individually pointed in various directions, including laterally toward the scales of device 10. When an ocean bottom scene is being viewed through closed circuit television while vehicle 56 rests on the ocean bottom, the operator cannot properly interpret the two-dimensional, remote, television display without knowledge of the direction and magnitude of the slope on which vehicle 56 rests. In order to provide this information, one of the two camera stations is directed toward inclinometer device 10, providing a display of its scale readings at the remote station. For example in the situation depicted in FIG. 6, camera 62a is shown viewing an external scene ahead of the vehicle, while camera 62b is directed laterally toward inclinometer device 10 where it will provide the remote station with a display of the device's scales. It will be appreciated that the duplication of the scales and pointers on both sides of the graduated quadrant 18b and both lateral peripheries of ring 30 is of particular utility in this situation. As a result either cameras 62a or 62b may be used to obtain a display of the scales. It should be further noted that it is intended that vehicle 56 will carry a gyro compass 66 which is linked to a display at the remote station. This provides the operator with information concerning the true heading of the vehicle. As a result the relative bearing readings of device 10 can, by simple calculations, be converted to a true bearing, and vehicle 56 can be used for the purpose of mapping the topography of the ocean bottom.

While the utility of device 10 has been illustrated in the environment of a television camera for use with an ocean bottom exploration vehicle, it will be appreciated that it has broader utility as well. For example, it may be suitably mounted to the frame of an earth grading vehicle where its scales may be directly observed by the operator to enable him to ascertain the direction and angular magnitude of slope.

Obviously many modifications and variations of the present invention are possible in the light of the above teachings. It is therefore to be understood that within the scope of the appended claims the invention may be practiced otherwise than as specifically described.

What is claimed is:

1. A pendulous inclinometer for indicating inclination and bearing comprising,
   a frame member which defines a vertical pivot axis,
   a plate member pivotally mounted to the frame member rotation about the vertical axis,
   a pendulum pivotally mounted to the plate member at a point along the vertical pivot axis for rotation about an axis which is perpendicular to the plane of the plate member,
   an annular ring mounted on the frame member so as to centrally encircle the vertical pivot axis, said ring having an outer peripheral edge,
   bearing indicia located on the outer peripheral edge of the annular ring so as to be capable of being seen from a side of the inclinometer,
   a transverse shaft mounted on the plate member and extending axially along the axis of rotation of the pendulum and terminating in close proximity to the bearing indicia so as to be capable of indicating bearing from a side view of the inclinometer,
   a pointer mounted on each end of the transverse shaft, each pointer being located outside the edge of the ring and extending in a downward direction,
   inclination indicia located on said plate member so as to be capable of being seen from said side of the inclinometer, and
   said pendulum having an upwardly extending pointer which terminates adjacent inclination indicia so as to be capable of indicating inclination from a view of said side of the inclinometer.

2. A pendulous inclinometer as claimed in claim 1 including:
   said bearing indicia being located on opposite edge portions of the annular ring,
   said transverse shaft extending in both directions from the pendulum and terminating at opposite ends adjacent respective bearing indicia,
   said inclination indicia being located on opposite sides of the plate member, and
   said pendulum member having a pair of the upwardly extending pointers which straddle the plate member and terminate adjacent respective inclination indicia.

References Cited

UNITED STATES PATENTS

| | | | |
|---|---|---|---|
| 1,023,858 | 4/1912 | Laures. | |
| 1,346,547 | 7/1920 | Lackland. | |
| 2,851,785 | 9/1958 | Gaudin | 33—205 |
| 2,992,492 | 7/1961 | Roussin | 33—205 |

ROBERT B. HULL, Primary Examiner

U.S. Cl. X.R.

33—1, 206